United States Patent
Sullivan et al.

(10) Patent No.: US 7,372,577 B1
(45) Date of Patent: May 13, 2008

(54) MONOLITHIC, SPATIALLY-SEPARATED, COMMON PATH INTERFEROMETER

(75) Inventors: Mark T. Sullivan, Mountain View, CA (US); Lawrence J. Dries, Sunnyvale, CA (US); David F. Leary, Woodside, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/142,781

(22) Filed: May 31, 2005

(51) Int. Cl.
*G01B 9/02* (2006.01)
(52) U.S. Cl. .................. 356/493; 356/451; 356/498
(58) Field of Classification Search ............. 356/451, 356/492–493, 498
See application file for complete search history.

(56) References Cited

U.S. PATENT DOCUMENTS

| | | | | |
|---|---|---|---|---|
| 5,159,408 A * | 10/1992 | Waldenmaier et al. | ...... | 356/485 |
| 5,220,406 A * | 6/1993 | Kishner | ...... | 356/513 |
| 5,949,543 A | 9/1999 | Bleier et al. | | |
| 6,542,247 B2 * | 4/2003 | Bockman | ...... | 356/493 |
| 6,573,996 B1 * | 6/2003 | Deliwala et al. | ...... | 356/487 |
| 6,710,880 B1 * | 3/2004 | Zhao | ...... | 356/486 |
| 6,876,451 B1 * | 4/2005 | Carlson | ...... | 356/498 |

* cited by examiner

*Primary Examiner*—Layla G. Lauchman
*Assistant Examiner*—Iyabo S Alli
(74) *Attorney, Agent, or Firm*—McDermott Will & Emery LLP

(57) ABSTRACT

Spatially-separated heterodyne interferometer architecture is combined with monolithic glass construction techniques to provide a monolithic, spatially-separated, common-path interferometer. The monolithic interferometer includes multiple optical components bonded together into a monolithic structure. The bonded components provide both optics and structure for the interferometer, thereby producing a small, compact, and light-weight interferometry system. Beam splitters and combiners are provided on the interfaces between the optical components to direct and combine signal measurement, signal reference and local oscillator beams used in the interferometry system. The spatially-separated architecture reduces cyclic error values below those of polarization-separated interferometers. In addition, the monolithic architecture of the interferometer minimizes the impact of mechanical, thermal, and optical variations within the system.

16 Claims, 4 Drawing Sheets

MONOLITHIC, SPATIALLY-SEPARATED, COMMON PATH INTERFEROMETER

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of [CONTRACT NO.] awarded by [AGENCY].

BACKGROUND OF THE INVENTION

1. Field of the Invention

The present invention relates generally to interferometry, and specifically to a monolithic, spatially-separated, common-path interferometer.

2. Description of the Related Art

Interferometry has applications in many fields where precise measurement of movement is necessary. Fields using interferometry include aerospace, semiconductors, and general metrology.

Traditionally, interferometers utilize polarizing beam splitters to separate a measurement beam from a reference beam. The measurement beam is then reflected off a measuring object and the reference beam off a fixed reference object. Subsequently, when the polarization separated beams are mixed together, the beams interfere with each other, creating an interference pattern or an interferogram. Such interferograms are extremely sensitive to relative changes in the paths of the measurement beam and the reference beam. Thus, a precise measurement of changes in distance can be made by measuring changes in the resulting interference pattern signals of an interferometer.

Polarization-separated interferometers, however, suffer from polarization leakage, which can introduce errors and limit the measurement resolution to approximately 1 nanometer. Existing interferometers are also large, complex devices that are cumbersome to deploy and difficult to align. In addition, they suffer from various mechanical, thermal, and optical variations within the many components that make up the interferometers.

SUMMARY OF THE INVENTION

The present invention addresses the problems noted above by providing a monolithic, spatially-separated, common-path interferometer. The optical components of the interferometer are bonded together, which allows the interferometer to be permanently aligned at the time of assembly. This further allows systems using the interferometer to be small, compact and light weight and simplifies deployment and maintenance of those systems. To reduce errors and improve resolution over polarization-separated interferometers, the interferometer of the invention is designed to use spatially separated signal measurement and reference beams. One example of this spatially-separated architecture uses the core of a signal beam as the signal measurement beam and the annulus of the signal beam as the signal reference beam. Finally, the interferometer is designed so that the signal measurement and reference beams travel on a common path through the optical components of the interferometer. In this manner, the effect of relative mechanical, thermal, and optical variations within the interferometer are minimized, resulting in a more accurate and stable interferometry system.

Furthermore, the present invention adds multi-axis capabilities to the interferometer. The signal beam is divided into multiple beams for measurement along multiple axes. Again, all of the essential optic and structural components are bonded into a monolithic structure. By combining spatially-separated interferometry axes into one unit, the size and mass of the metrology system is further reduced.

According to one aspect of the invention, a monolithic interferometer includes a first optic for receiving a signal measurement beam and a signal reference beam. The signal measurement and reference beams are spatially distinct components of a signal beam. A second optic is bonded to the first optic and a polarized beam splitter is provided on the interface between the first and second optics. The signal measurement and reference beams having a first polarization are transmitted from the first optic to the second optic through the polarized beam splitter. A quarter-wave plate, which is bonded to a reference reflector, is bonded to the second optic. The signal reference beam is transmitted from the second optic to the reference reflector through the quarter-wave plate and is reflected by the reference reflector back to the second optic through the quarter-wave plate. The signal measurement beam is transmitted from the second optic to a measurement reflector through the quarter-wave plate and a non-reflective portion of the reference reflector and is reflected back to the second optic by the measurement reflector through the non-reflective portion of the reference reflector and the quarter-wave plate. The polarized beam splitter deflects the reflected signal measurement and reference beams, which have a second polarization orthogonal to the first polarization. A third optic is bonded to the second optic and receives a local oscillator beam. A beam combiner is provided on the interface between the second and third optics. The beam combiner combines the local oscillator beam with the reflected signal measurement and reference beams deflected by the polarized beam splitter.

The monolithic interferometer is preferably part of a metrology gauge that includes a laser source for generating the signal and local oscillator beams, collimators for collimating the beams, and a detector for receiving the combined measurement and local oscillator beam and the combined reference and local oscillator beam and for detecting optical phase differences between the combined beams.

According to another aspect of the invention, a multi-axis monolithic interferometer includes a multiplexer for dividing signal measurement and reference beams into multiple measurement and reference beams. The signal measurement and reference beams are spatially distinct components of a signal beam. A first optic receives the multiple signal measurement and reference beams. A second optic is bonded to the first optic and a polarized beam splitter is provided on the interface between the first and second optics. The signal measurement and reference beams having a first polarization are transmitted from the first optic to the second optic through the polarized beam splitter. Quarter-wave plates, which are bonded to respective reference reflectors, are bonded to the second optic. The signal reference beams are transmitted from the second optic to respective reference reflectors through respective quarter-wave plates and are reflected by the respective reference reflectors back to the second optic through the respective quarter-wave plates. The signal measurement beams are transmitted from the second optic to respective measurement reflectors through respective quarter-wave plates and non-reflective portions of respective reference reflectors and are reflected back to the second optic by the respective measurement reflectors through the non-reflective portions of the respective reference reflectors and the respective quarter-wave plates. The polarized beam splitter deflects the reflected signal measurement and reference beams, which have a second polarization orthogonal to the first polarization. A third optic is bonded to the second optic and receives a local oscillator beam. A beam combiner is provided on the interface between the second and third optics. The beam combiner combines the local oscillator beam with the reflected signal measurement and reference beams deflected by the polarized beam splitter.

The multi-axis monolithic interferometer is preferably part of a metrology gauge that includes a laser source for generating the signal and local oscillator beams, collimators for collimating the beams, and a detector for receiving the combined signal measurement and local oscillator beam and the combined signal reference and local oscillator beam and for detecting optical phase differences between the combined beams.

Other and further objects and advantages of the present invention will be further understood and appreciated by those skilled in the art by reference to the following specification, claims, and drawings.

DETAILED DESCRIPTION OF THE INVENTION

Figure 1:
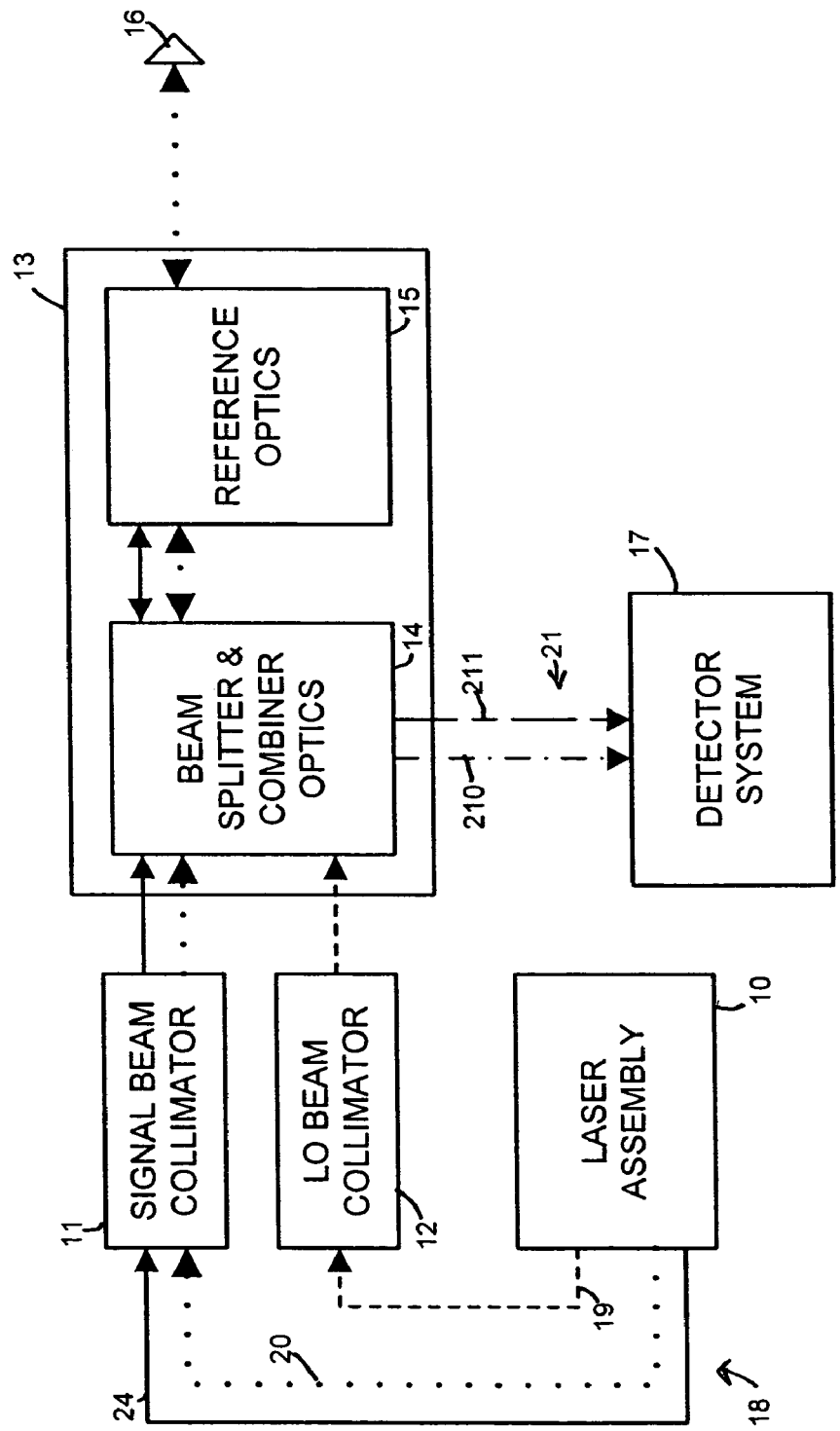
FIG. 1 illustrates a block diagram of the primary components of a metrology gauge using a monolithic, spatially-separated, common-path interferometer according to one embodiment of the present invention.

FIG. 1 is a block diagram depicting the primary components of a metrology gauge utilizing a monolithic, spatially-separated, common-path interferometer according to one embodiment of the invention. As shown in FIG. 1, the metrology gauge includes laser assembly 10, signal beam collimator 11, local oscillator (LO) beam collimator 12, interferometer 13, which is comprised of beam splitter and combiner optics 14 and reference optics 15, measurement reflector 16 and detector system 17.

Laser assembly 10 provides a signal beam 18, which includes signal measurement beam 20 (depicted as a dotted line) and signal reference beam 24 (depicted as a solid line), and LO beam 19, which is depicted as a dashed line, to signal beam collimator 11 and LO beam collimator 12, respectively. Signal measurement beam 20 and signal reference beam 24 are spatially distinct beams, as described in more detail below. The beams are generated within laser assembly 10 using one or more laser sources together with frequency modulators to shift the frequency of LO beam 19 from the frequency of signal beam 18. Typically, the generated beams are transmitted to the collimators using a fiber optic distribution network. One skilled in the art will recognize other systems and methods that can be used to generate and transmit signal beam 18 and LO beam 19 without departing from the scope of the invention.

Interferometer 13 receives the collimated beams from signal beam collimator 11 and LO beam collimator 12 and transmits signal measurement beam 20 to measurement reflector 16. Measurement reflector 16 is attached to an object (not shown) whose change in position with respect to interferometer 13 is detected by the metrology gauge. Measurement reflector 16 is typically a corner cube reflector, however, other reflective devices can be used. Signal measurement beam 20 is reflected back to interferometer 13 by measurement reflector 16.

Interferometer 13 then combines LO beam 19 with the reflected signal measurement beam 20 and signal reference beam 24 of signal beam 18 into a heterodyned combined beam 21. Combined beam 21 includes heterodyne measurement beam 210 (depicted as a dashed/dotted line) and heterodyne reference beam 211 (depicted as an alternating dashed line). Heterodyne measurement beam 210 and heterodyne reference beam 211 are transmitted to detector system 17. Using known interferometry techniques, detector system 17 detects changes in distance between interferometer 13 and measurement reflector 16 based on detected optical phase differences in heterodyne measurement beam 210 and heterodyne reference beam 211. A more detailed explanation of the operation of interferometer 13 is provided below.

Figure 2:
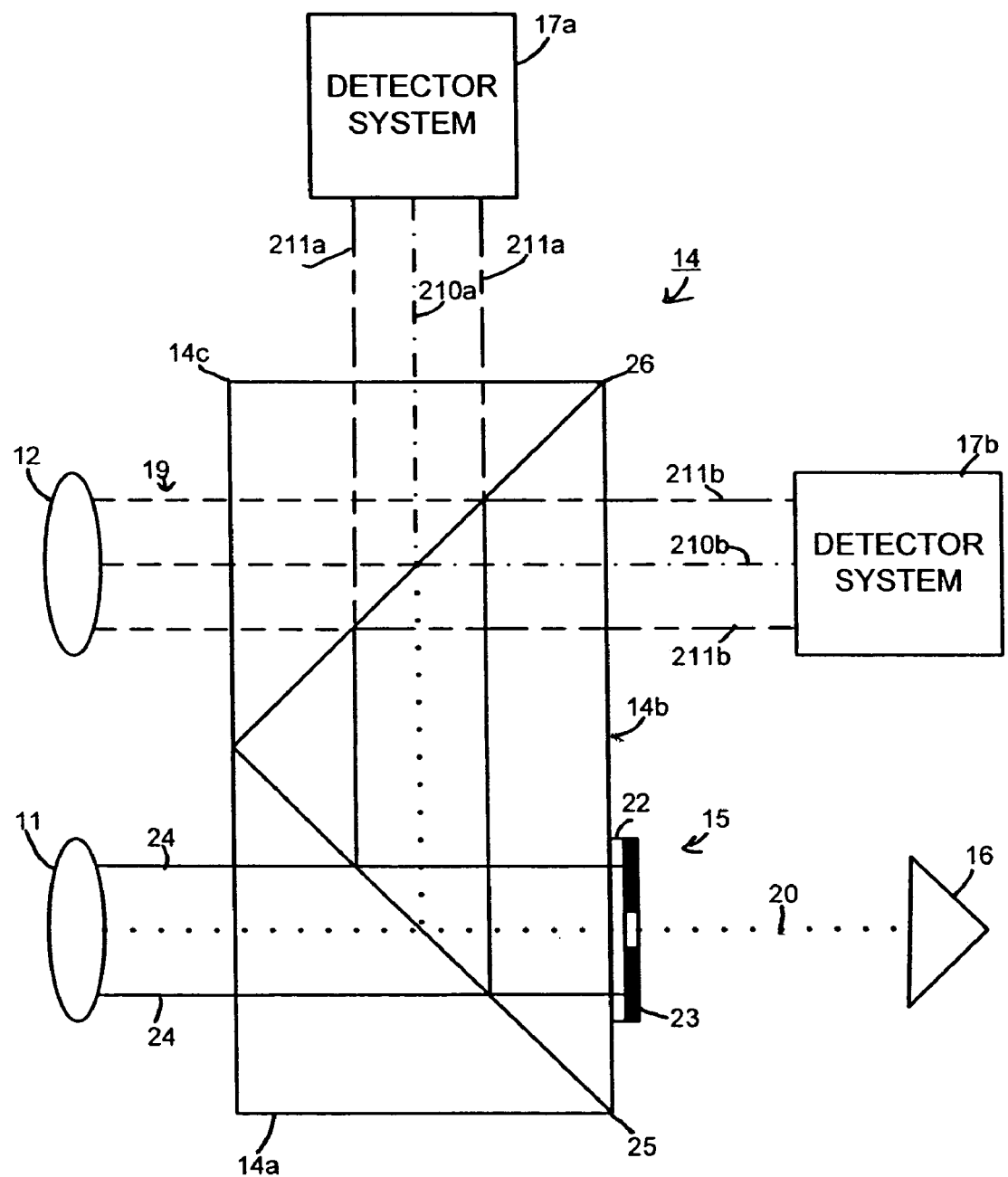
FIG. 2 illustrates a schematic diagram depicting the components of a monolithic, spatially-separated, common-path interferometer according to one embodiment of the present invention.

FIG. 2 is a schematic diagram depicting the components of interferometer 13 according to one embodiment of the invention. As mentioned above, interferometer 13 includes beam splitter and combiner optics 14 and reference optics 15. As shown in FIG. 2, beam splitter and combiner optics 14 includes three optical components 14a, 14b and 14c, which are bonded together. The optical components 14a, 14b and 14c are prisms or cubes preferably made of glass. However, other transparent media can be used to form optical components 14a, 14b and 14c in alternative embodiments of the invention. Optical components 14a, 14b and 14c are bonded together using traditional adhesives, optical contacting, and/or hydroxide-catalyzed bonding (e.g., potassium hydroxide solution). Other bonding techniques and materials known to those skilled in the art can be used without departing from the scope of the invention.

Reference optics 15 comprises quarter-wave plate 22 and reference reflector 23. Quarter-wave plate 22 and reference reflector 23 are bonded together using any of the bonding techniques mentioned above. The bonded reference optics 15 is bonded to beam splitter and combiner optics 14 in a similar manner.

As mentioned above, signal beam 18 comprises two spatially distinct components: signal measurement beam 20 and signal reference beam 24. According to one embodiment of the invention, these two components are spatially separated by using the core of signal beam 18 as signal measurement beam 20 and the annulus of signal beam 18 as signal reference beam 24. In this manner, the two concentric beams are spatially separated and follow a common path within interferometer 13. Using spatial separation removes sensitivity to polarization leak-though that limits the resolution of conventional polarization-separated interferometers. By employing the spatially separated interferometry architecture, a resolution of 10 picometers or better is possible, whereas conventional polarization-separated interferometers are typically limited to resolutions of 1 nanometer. Signal reference beam 24 is depicted as two solid lines parallel to the dotted line representing signal measurement beam 20. Alternative embodiments may switch the portions of signal beam 18 used for each component, or may divide signal beam 18 in a different manner to obtain the two spatially distinct component beams.

As illustrated in FIG. 2, signal measurement beam 20 and signal reference beam 24 travel down an optical path through optical components 14a and 14b and through quarter-wave plate 22 to reference reflector 23. Reference reflector 23 reflects the annulus of signal beam 18, which is signal reference beam 24, back into optical component 14b. The core of signal beam 18, which is signal measurement beam 20, passes through a non-reflecting portion of reference reflector 23 and is transmitted to measurement reflector 16. Measurement reflector 16 reflects signal measurement beam 20 back through reference reflector 23 and quarter-wave plate 22 into optical component 14b. According to one embodiment of the invention, reference reflector 23 is an annulus mirror. Alternative embodiments of the invention can use other reflective devices such as a corner cube with the apex removed to allow signal measurement beam 20 to pass through.

The interface between optical components 14a and 14b is treated using known techniques to provide a polarized beam splitter 25. Signal measurement beam 20 and signal reference beam 24 are initially linearly polarized with either a p-polarization or an s-polarization. The initial linear polarization allows signal measurement beam 20 and signal reference beam 24 to pass through polarized beam splitter 25. When signal measurement beam 20 and signal reference beam 24 initially pass through quarter-wave plate 22, the linear polarization is changed to a circular polarization. After being reflected by measurement reflector 16 and reference reflector 23, signal measurement beam 20 and signal reference beam 24 pass back through quarter-wave plate 22, which changes the polarization of the beams from a circular polarization to a linear polarization orthogonal to the initial linear polarization of the beams. The orthogonal linear polarization causes the reflected signal measurement beam 20 and signal reference beam 24 to be deflected by polarized beam splitter 25.

The deflected signal measurement beam 20 and the deflected signal reference beam 24 travel through optical component 14b towards optical component 14c. The interface between optical components 14b and 14c is treated using known techniques to provide beam splitter/combiner 26. The collimated LO beam 19 transmitted from LO beam collimator 12 travels through optical component 14c and intersects signal measurement beam 20 and signal reference beam 24 at beam splitter/combiner 26. Beam splitter/combiner 26 mixes LO beam 19 with signal measurement beam 20 and with signal reference beam 24 to form heterodyne beams. Beam splitter/combiner 26 splits the heterodyne beams into heterodyne measurement beams 210a and 210b, which are depicted as dashed/dotted lines, and into heterodyne reference beams 211a and 211b, which are depicted as alternating dashed lines. After being split by beam splitter/combiner 26, heterodyne measurement beam 210a and heterodyne reference beam 211a are directed to detector system 17a and heterodyne measurement beam 210b and heterodyne reference beam 211b are directed to detector system 17b.

Detector systems 17a and 17b detect changes in the position of the object attached to measurement reflector 16 based on interferogram signals created when LO beam 19 is combined with signal measurement beam 20 and signal reference beam 24. The changes in position are determined using known interferometry techniques, which are discussed further herein. The use of two detector systems is an optional feature of the invention that allows the implementation of a primary detector system and a redundant detector system. Alternative embodiments of the invention can include a single detector system. The use of two detector systems also allows weak heterodyne signals detected by detector systems 17a and 17b to be combined for more accurate detection than could be obtained using a single weak signal.

As described above, interferometer 13 is a monolithic structure formed using its optical components as both optics and structure. In this manner, the ancillary metal components of traditional interferometers are not necessary. Hence, the size and mass of interferometer 13 are reduced, allowing smaller, lighter metrology systems and thus making possible more widespread use of the spatially-separated interferometer architecture. It is to be understood that the components and configuration depicted in FIG. 2 represent a single embodiment of the invention. Other configurations and components can be included in alternative embodiments without departing from the scope of the invention. For example, signal beam collimator 11 and/or LO beam collimator 12 can be spaced apart from interferometer 13, as shown in FIG. 2, or directly in contact and bonded with interferometer 13.

A significant advantage of the present invention is the alignment of the optical components of interferometer 13. Since the optical components are bonded together in a monolithic structure, alignment of the components is performed during assembly. The alignment of interferometer 13 is dependent upon the manufacturing tolerances of each of the optical components and is permanent once the optical components have been bonded together. This feature simplifies deployment and maintenance and provides additional stability to a metrology system using a monolithic interferometer according to the present invention.

The common-path architecture of the present invention, combined with the monolithic construction, provides additional advantages over conventional systems. For example, signal measurement beam 20 and signal reference beam 24 have a common path that passes through the same length of glass in the optical components of interferometer 13. This feature reduces the sensitivity of the system to changes in thermal gradients, which effect the accuracy of the interferometer. Similarly, the beams in the interferometer are subject to the same mechanical, thermal, and optical variations, greatly reducing inaccuracies attributable to such variations.

Figure 3:
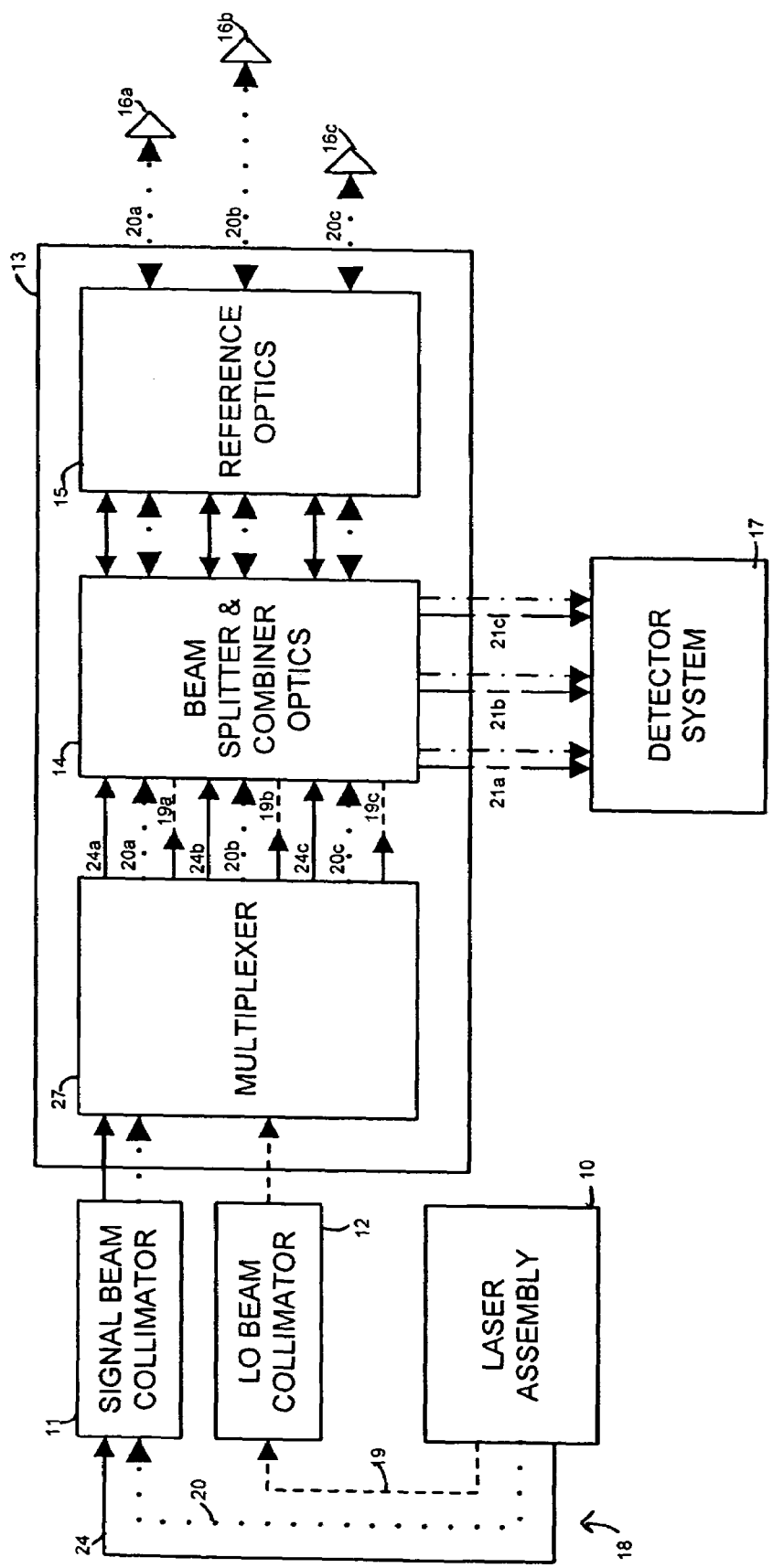
FIG. 3 illustrates a block diagram of the primary components of a multi-axis metrology gauge using a multi-axis monolithic, spatially-separated, common-path interferometer according to one embodiment of the present invention.

FIG. 3 is a block diagram depicting the primary components of a multi-axis metrology gauge utilizing a monolithic, spatially-separated, common-path interferometer according to one embodiment of the invention. Components similar to the components depicted in FIG. 1 have been given common reference numbers. As shown in FIG. 3, the metrology gauge includes laser assembly 10, signal beam collimator 11, local oscillator (LO) beam collimator 12, interferometer 13, which includes multiplexer 27, beam splitter and combiner optics 14, and reference optics 15, measurement reflector 16 and detector system 17.

Similar to the embodiment depicted in FIG. 1, laser assembly 10 provides signal beam 18, which includes signal measurement beam 20 (depicted as a dotted line) and signal reference beam 24 (depicted as a dashed line), and LO beam 19 to signal beam collimator 11 and LO beam collimator 12, respectively. Signal measurement beam 20 and signal reference beam 24 are spatially distinct beams, as described above. The beams are generated within laser assembly 10 using one or more laser sources together with frequency modulators to shift the frequency of LO beam 19 from the frequency of signal beam 18. Typically, the generated beams are transmitted to the respective collimators using a fiber optic distribution network. One skilled in the art will recognize other systems and methods that can be used to generate and transmit signal beam 18 and LO beam 19 without departing from the scope of the invention.

Interferometer 13 receives the collimated beams from signal beam collimator 11 and LO beam collimator 12 and splits signal measurement beam 20 into three signal measurement beams 20a, 20b and 20c, signal reference beam 24 into three signal reference beams 24a, 24b and 24c, and LO beam 19 into three LO beams 19a, 19b and 19c. The three sets of beams are used to detect changes in distance along three respective axes. It is to be understood, however, that interferometer 13 can split signal measurement beam 20, signal reference beam 24 and LO beam 19 into a different number of beams to facilitate measurement along other numbers of axes without departing from the scope of the invention.

Interferometer 13 transmits signal measurement beams 20a, 20b and 20c to respective ones of measurement reflectors 16a, 16b and 16c. Each of measurement reflectors 16a, 16b and 16c is attached to a respective object (not shown) whose change in position with respect to interferometer 13 is detected by the metrology gauge. Measurement reflectors 16a, 16b and 16c are typically corner cube reflectors, however, other reflective devices can be used. Signal measurement beams 20a, 20b and 20c are reflected back into interferometer 13 by measurement reflectors 16a, 16b and 16c.

Interferometer 13 combines LO beams 19a, 19b and 19c with respective ones of signal measurement beams 20a, 20b and 20c and respective ones of signal reference beams 24a, 24b and 24c into heterodyned combined beams 21a, 21b and 21c. Each of combined beams 21a, 21b and 21c include a corresponding heterodyne measurement beam (depicted as a dashed/dotted line) and a corresponding heterodyne reference beam (depicted as an alternating dashed line). Combined beams 21a, 21b and 21c are transmitted to detector system 17, which detects changes in distance between interferometer 13 and measurement reflectors 16a, 16b and 16c using known interferometry techniques. Detector system 17 is depicted as a single system in FIG. 3. It is to be understood, however, that an individual detector system can be used for each combined beam or some other multiple of combined beams without departing from the scope of the invention. A more detailed explanation of interferometer 13 according to this multi-axis embodiment is provided below.

Figure 4:
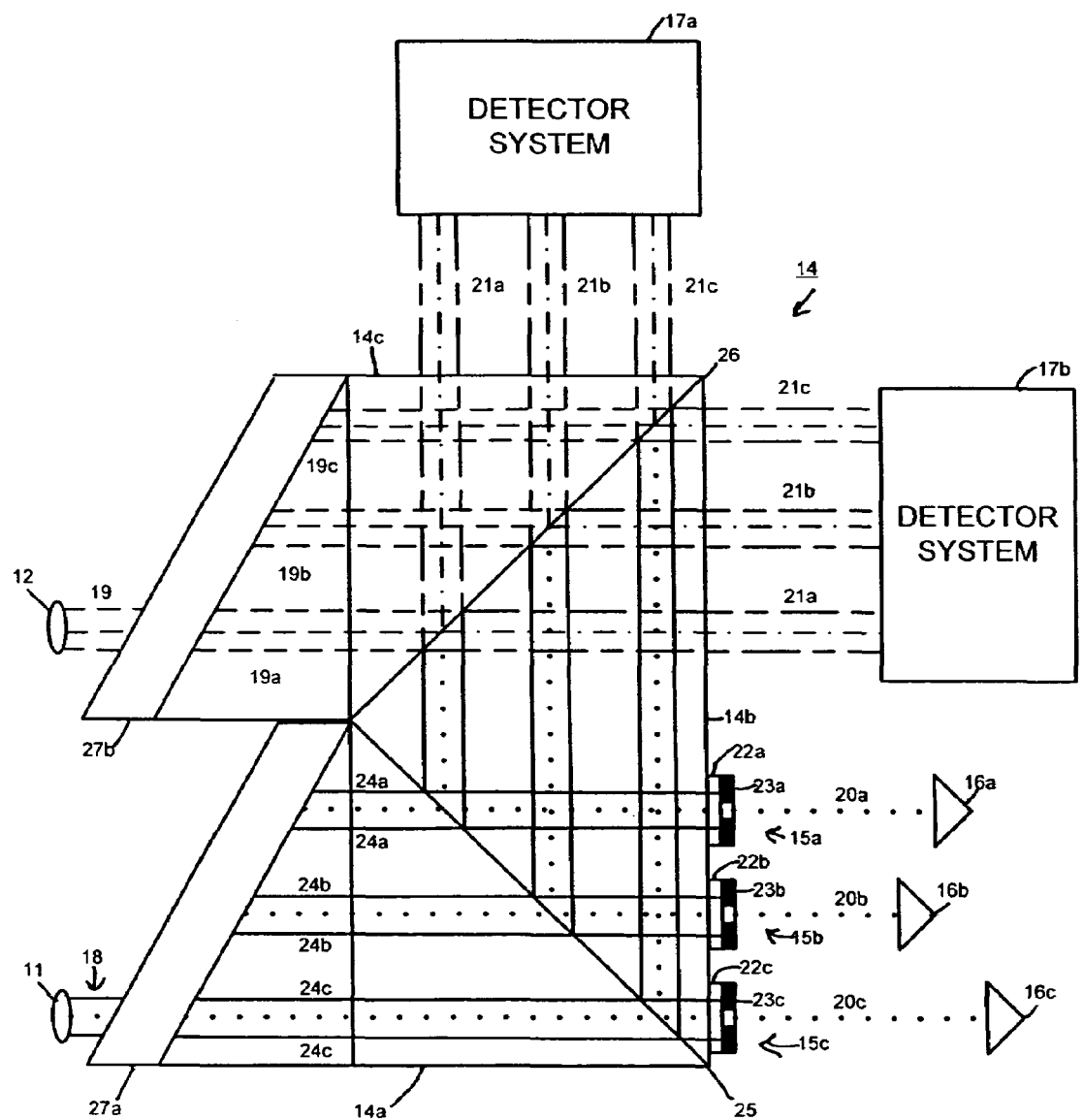
FIG. 4 illustrates a schematic diagram depicting the components of a multi-axis, monolithic, spatially-separated, common-path interferometer according to one embodiment of the present invention.

FIG. 4 is a schematic diagram depicting the components of interferometer 13 according to a multi-axis embodiment of the invention. Interferometer 13 includes multiplexers 27a and 27b, beam splitter and combiner optics 14 and reference optics 15a, 15b and 15c. Multiplexer 27a is an optical component that receives signal beam 18, which includes a signal measurement beam and a signal reference beam, and splits the beam into multiple beams. In the embodiment depicted in FIG. 4, multiplexer 27a splits signal beam 18 into three signal measurement beams 20a, 20b and 20c (depicted as dotted lines) and three corresponding signal reference beams 24a, 24b and 24c (depicted as solid lines parallel to corresponding signal measurement beams). Multiplexer 27a is an optical component made of glass or another transparent medium with appropriate surface treatments known to those skilled in the art. According to one embodiment of the invention, multiplexer 27a is implemented as a shear plate for splitting the beam into the desired number of beams. Alternative embodiments of the invention can use an array of rhomboids (not shown) configured as beam splitters to split the beam into the desired number of beams. Other beam splitting optical components known to those skilled in the art can be used without departing from the scope of the invention.

Multiplexer 27a transmits signal measurement beams 20a, 20b and 20c and signal reference beams 24a, 24b and 24c into beam splitter and combiner optics 14, which comprises optical components 14a, 14b and 14c. Beam splitter and combiner optics 14 are implemented and operate in a similar manner as that described above with reference to FIG. 2. Each of signal measurement beams 20a, 20b and 20c and signal reference beams 24a, 24b and 24c travels through interferometer 13 along a path similar to the path of signal reference beam 24 and signal measurement beam 20 described above with reference to FIG. 2. Specifically, the beams travel through optical components 14a and 14b and a respective one of quarter-wave plates 22a, 22b and 22c. The signal reference beams are reflected back by a respective one of reference reflectors 23a, 23b and 23c, and the signal measurement beams are reflected back by a respective one of measurement reflectors 16a, 16b and 16c. The signal measurement and reference beams are combined with respective ones of LO beams 19a, 19b and 19c into corresponding heterodyne combined beams 21a, 21b and 21c and are transmitted to detector systems 17a and 17b for detection. For details on the optical paths of the signal measurement and reference beams in interferometer 13, please refer to the description of FIG. 2 provided above.

As shown in FIG. 4, multiplexer 27b splits LO beam 19 into three LO beams 19a, 19b and 19c, which are subsequently combined with the signal measurement and reference beams. Like multiplexer 27a, multiplexer 27b is an optical component made of glass or another transparent medium with appropriate surface treatments known to those skilled in the art. According to one embodiment of the invention, multiplexer 27b is implemented as a shear plate for splitting the beam into the desired number of beams. An alternative embodiment of the invention uses an array of rhomboids (not depicted) configured as beam splitters to split the beam into the desired number of beams. While FIG. 4 depicts two multiplexers 27a and 27b, it is to be understood that a single multiplexer designed to split both signal beam 18 and LO beam 19 could be used in other embodiments. In addition, other types and configurations of beam splitting optical components known to those skilled in the art can be used without departing from the scope of the invention. Other alternative embodiments include using a single LO beam 19 having a beam diameter wide enough to mix with all the signal reference and measurement beams in interferometer 13.

Detector systems 17a and 17b detect changes in the positions of measurement reflectors 16a, 16b and 16c based on interferogram signals created when the respective LO beams combine and interfere with the respective signal measurement and reference beams. The changes in positions are determined using known interferometry techniques which are described further herein. The use of two detector systems is an optional feature of the invention that provides a primary detector system and a redundant detector system. The redundant detector system can act as a backup to the primary detector system. Alternatively, the use of two detector systems allows weak heterodyne signals detected by detector systems 17a and 17b to be combined for more accurate detection than could be obtained using a single weak signal. Alternative embodiments of the invention can include a single detector system or various numbers of detector systems, with each detector system being used for detecting one or more combined beams 21.

Interferometer 13 depicted in FIG. 4 is a monolithic structure formed using its optical components as both optics and structures. The optical components, namely multiplexer 27, beam splitter and combiner optics 14 and reference optics 15 are bonded together using the bonding techniques described above. In this manner, the ancillary metal components of traditional interferometers are not necessary. Hence the size and mass of interferometer 13 are reduced, allowing smaller, lighter metrology systems. It is to be understood that the components and configuration depicted in FIG. 4 represent a single embodiment of the invention. Other configurations and components can be included in alternative embodiments of the invention without departing from the scope thereof. For example, signal beam collimator 11 and/or LO beam collimator 12 can be spaced apart from multiplexers 27a and 27b, as shown in FIG. 4, or directly in contact and bonded with multiplexers 27a and 27b.

As with the single-axis embodiment of the invention, the alignment of the optical components forming interferometer 13 provides a significant advantage over conventional interferometers. Since the optical components are bonded together in a monolithic structure, alignment of the components is performed during assembly of the device. The alignment of the components is therefore dependent upon the manufacturing tolerances of the individual components and is permanent once the interferometer has been bonded together. This advantage of the invention simplifies implementation and maintenance and provides improved axis-to-axis stability compared to conventional multi-axis systems.

Another significant advantage of the invention over conventional systems is the common-path architecture of interferometer 13. Respective pairs of measurement beams 20a, 20b and 20c and reference beams 24a, 24b and 24c travel a common optical path through interferometer 13. This feature reduces the sensitivity of the system to changes in thermal gradients, which affect the accuracy of the interferometer. Additionally, the respective pairs of beams are subject to the same mechanical, thermal and optical variations, greatly reducing inaccuracies attributable to such variations.

The foregoing description of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A metrology gauge for detecting a change in position of an object, comprising:
a monolithic interferometer comprising:
first optic for receiving a measurement beam and a reference beam, wherein the measurement beam and the reference beam are spatially distinct concentric beams;
second optic bonded to said first optic;
polarized beam splitter on an interface between said first and second optics, wherein the measurement and reference beams having a first polarization are transmitted from said first optic to said second optic through said polarized beam splitter;
quarter-wave plate bonded to said second optic;
a reference reflector bonded to said quarter-wave plate, wherein the reference beam is transmitted from said second optic to said reference reflector through said quarter-wave plate and is reflected by said reference reflector back to said second optic through said quarter-wave plate,
wherein the measurement beam is transmitted from said second optic to a measurement reflector through said quarter-wave plate and through a non-reflective portion of said reference reflector and is reflected back to said second optic by the measurement reflector through the non-reflective portion of said reference reflector and said quarter-wave plate,
wherein said polarized beam splitter deflects the reflected measurement and reference beams having a second polarization orthogonal to the first polarization;
a third optic bonded to said second optic, said third optic for receiving a local oscillator beam; and
a beam combiner on an interface between said second and third optics, said beam combiner for combining the local oscillator beam and the reflected measurement beam into a primary combined measurement and local oscillator beam and a redundant combined measurement and local oscillator beam, and for combining the local oscillator beam and the reflected reference beam into a primary combined reference and local oscillator beam and a redundant combined reference and local oscillator beam; and
a redundant detector for receiving the redundant combined measurement and local oscillator beam and the redundant combined reference and local oscillator beam, and for detecting optical phase differences between the beams.

2. The metrology gauge according to claim 1, wherein the measurement beam is a center beam and the reference beam is an annulus beam, and
wherein said reference reflector is an annulus mirror.

3. The metrology gauge according to claim 1, wherein the measurement and reference beams are concentric beams with the measurement beam being a center beam and the reference beam being an annulus beam, and
wherein said reference reflector is a corner cube reflector with the apex removed.

4. The metrology gauge according to claim 1, wherein said first, second and third optics are prisms.

5. The metrology gauge according to claim 1, wherein the measurement and reference beams follow a common path through said first, second and third optics.

6. The metrology gauge according to claim 1, wherein the measurement reflector is attached to the object.

7. The metrology gauge according to claim 1, wherein the detection outputs of said detector and said redundant detector are combined.

8. A multi-axis metrology gauge for detecting changes in positions of a plurality of objects, comprising:
a multi-axis monolithic interferometer comprising:
a multiplexer for dividing measurement and reference beams into a plurality of measurement and reference beams, wherein the measurement and reference beams are spatially distinct, and wherein the plurality of measurement and reference beams are corresponding concentric beams;
a first optic for receiving the plurality of measurement and reference beams;
a second optic bonded to said first optic;
a polarized beam splitter on an interface between said first and second optics, wherein the plurality of measurement and reference beams having a first polarization are transmitted from said first optic to said second optic through said polarized beam splitter;

a plurality of quarter-wave plates bonded to said second optic;

a plurality of reference reflectors bonded to respective ones of said plurality of quarter-wave plates, wherein the plurality of reference beams are transmitted from said second optic to respective ones of said plurality of reference reflectors through said respective quarter-wave plates and are reflected by said respective reference reflectors back to said second optic through said respective quarter-wave plates, wherein the plurality of measurement beams are transmitted from said second optic to respective ones of a plurality of measurement reflectors through respective ones of said plurality of quarter-wave plates and through non-reflective portions of said respective reference reflectors and are reflected back to said second optic by the respective measurement reflectors through the non-reflective portions of said respective reference reflectors and said respective quarter-wave plates, wherein said polarized beam splitter deflects the reflected plurality of measurement and reference beams having a second polarization orthogonal to the first polarization;

a third optic bonded to said second optic, said third optic for receiving a local oscillator beam; and a beam combiner on an interface between said second and third optics, said beam combiner for combining the local oscillator beam and the plurality of reflected measurement beams into a plurality of primary combined measurement and local oscillator beams and a plurality of redundant combined measurement and local oscillator beams, and for combining the local oscillator beam and the plurality of reflected reference beams into a plurality of primary combined reference and local oscillator beams and a plurality of redundant combined reference and local oscillator beams; and a redundant detector for receiving the redundant combined measurement and local oscillator beams and the redundant combined reference and local oscillator beams, and for detecting optical phase differences between the beams.

9. The multi-axis metrology gauge according to claim 8, each measurement beam is a center beam and each reference beam is an annulus beam, and wherein said plurality of reference reflectors are annulus mirrors.

10. The multi-axis monolithic interferometer metrology gauge according to claim 8, wherein the plurality of measurement and reference beams are corresponding concentric beams with each measurement beam being a center beam and each reference beam being an annulus beam, and wherein said plurality of reference reflectors are corner cube reflectors with the respective apexes removed.

11. The multi-axis metrology gauge according to claim 8, wherein said first, second and third optics are prisms.

12. The multi-axis metrology gauge according to claim 8, wherein said multiplexer comprises a shear plate.

13. The multi-axis metrology gauge according to claim 8, wherein said multiplexer comprises a plurality of rhomboids configured as beam splitters.

14. The multi-axis metrology gauge according to claim 8, further comprising a second multiplexer for dividing the local oscillator beam into a plurality of local oscillator beams corresponding to the plurality of measurement and reference beams, wherein said third optic receives the plurality of local oscillator beams and said beam combiner combines the plurality of local oscillator beams with respective ones of the plurality of reflected measurement and reference beams.

15. The multi-axis metrology gauge according to claim 8, wherein the plurality of measurement and reference beams follow common respective paths through said first, second and third optics.

16. The multi-axis metrology gauge according to claim 8, wherein the plurality of measurement reflectors are attached to respective ones of the plurality of objects.

* * * * *

UNITED STATES PATENT AND TRADEMARK OFFICE
CERTIFICATE OF CORRECTION

| | |
|---|---|
| PATENT NO. | : 7,372,577 B1 |
| APPLICATION NO. | : 11/142781 |
| DATED | : May 13, 2008 |
| INVENTOR(S) | : Mark T. Sullivan et al. |

It is certified that error appears in the above-identified patent and that said Letters Patent is hereby corrected as shown below:

<u>IN THE CLAIMS</u>

In claim 9, column 12, line 5, "each measurement beam" should read --wherein each measurement beam--.

In claim 10, column 12, line 9, "multi-axis monolithic interferometer metrology" should read --multi-axis metrology--.

Signed and Sealed this

Fourteenth Day of October, 2008

JON W. DUDAS
*Director of the United States Patent and Trademark Office*